United States Patent
Kang et al.

(10) Patent No.: US 12,470,700 B2
(45) Date of Patent: Nov. 11, 2025

(54) METHOD AND APPARATUS FOR VIDEO CODING FOR IMPROVING PREDICTED SIGNALS OF INTRA PREDICTION

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Jung Kyung Lee, Seoul (KR); Na Young Kim, Seoul (KR); Seung Wook Park, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 133 days.

(21) Appl. No.: 18/240,888

(22) Filed: Aug. 31, 2023

(65) Prior Publication Data
US 2023/0412798 A1 Dec. 21, 2023

Related U.S. Application Data

(63) Continuation of application No. PCT/KR2022/002996, filed on Mar. 3, 2022.

(30) Foreign Application Priority Data

Mar. 4, 2021 (KR) .................. 10-2021-0028794
Feb. 28, 2022 (KR) .................. 10-2022-0026005

(51) Int. Cl.
*H04N 19/11* (2014.01)
*H04N 19/119* (2014.01)
(Continued)

(52) U.S. Cl.
CPC ........... *H04N 19/11* (2014.11); *H04N 19/119* (2014.11); *H04N 19/176* (2014.11); *H04N 19/42* (2014.11);
(Continued)

(58) Field of Classification Search
CPC ........ G06T 9/00; H04N 19/105; H04N 19/11; H04N 19/119; H04N 19/176; H04N 19/42; H04N 19/593; H04N 19/70; H04N 19/91
(Continued)

(56) References Cited

U.S. PATENT DOCUMENTS 11,115,673 B2    9/2021    Yang
11,196,992 B2    12/2021    Huang et al.
(Continued)

FOREIGN PATENT DOCUMENTS

KR    20190043930 A    4/2019
KR    20190132415 A    11/2019
(Continued)

OTHER PUBLICATIONS

International Search Report and Written Opinion cited in corresponding international app No. PCT/KR2022/002996 ; Jun. 17, 2022; 10 pp.

*Primary Examiner* — Kathleen M Walsh
(74) *Attorney, Agent, or Firm* — Lempia Summerfield Katz LLC

(57) ABSTRACT

A video coding method and an apparatus for refining predicted signals in intra prediction are disclosed. The video coding method and apparatus generate refined prediction
(Continued)

signals approximating original video signals from predicted signals of intra prediction using a variable and fixed coefficient-based deep learning model to reduce the amount of data for residual signals, which are to be encoded.

16 Claims, 15 Drawing Sheets

(51) Int. Cl.
*H04N 19/176* (2014.01)
*H04N 19/42* (2014.01)
*H04N 19/593* (2014.01)
*H04N 19/70* (2014.01)
*H04N 19/91* (2014.01)

(52) U.S. Cl.
CPC ........... *H04N 19/593* (2014.11); *H04N 19/70* (2014.11); *H04N 19/91* (2014.11)

(58) Field of Classification Search
USPC .................................................... 375/240.12
See application file for complete search history.

(56) References Cited

U.S. PATENT DOCUMENTS

| | | | |
|---|---|---|---|
| 11,468,318 | B2 | 10/2022 | Liu et al. |
| 11,477,439 | B2 | 10/2022 | Kim |
| 11,589,041 | B2 | 2/2023 | Huang et al. |
| 11,694,125 | B2 | 7/2023 | Yang |
| 2018/0249158 | A1* | 8/2018 | Huang ................. H04N 19/117 |
| 2019/0124348 | A1* | 4/2019 | Yang .................... H04N 19/136 |
| 2020/0012940 | A1 | 1/2020 | Liu et al. |
| 2020/0053385 | A1* | 2/2020 | Lee ....................... H04N 19/573 |
| 2021/0195176 | A1 | 6/2021 | Kim |
| 2022/0007045 | A1 | 1/2022 | Yang |
| 2022/0078418 | A1 | 3/2022 | Huang et al. |
| 2022/0232206 | A1* | 7/2022 | Lee ....................... H04N 19/593 |
| 2023/0024256 | A1 | 1/2023 | Kim |
| 2023/0024482 | A1 | 1/2023 | Kim |
| 2023/0026401 | A1 | 1/2023 | Kim |
| 2023/0026704 | A1 | 1/2023 | Kim |
| 2023/0087855 | A1* | 3/2023 | Tang .................... H04N 19/593 375/240.12 |

FOREIGN PATENT DOCUMENTS

| | | |
|---|---|---|
| KR | 20200028856 A | 3/2020 |
| KR | 102124714 B1 | 6/2020 |
| KR | 20200144480 A | 12/2020 |

* cited by examiner

METHOD AND APPARATUS FOR VIDEO CODING FOR IMPROVING PREDICTED SIGNALS OF INTRA PREDICTION

CROSS-REFERENCE TO RELATED APPLICATIONS

This application is a Continuation of International Application No. PCT/KR2022/002996 filed on Mar. 3, 2022, which claims priority to Korean Patent Application No. 10-2021-0028794 filed on Mar. 4, 2021, and Korean Patent Application No. 10-1011-0015004 filed on Feb. 28, 2022, the entire disclosures of which are incorporated herein by reference.

TECHNICAL FIELD

The present disclosure relates to a video coding method and an apparatus for improving predicted signals in intra prediction.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Recently, deep learning-based image processing techniques have been applied to existing encoding elemental technologies. Coding efficiency can be improved by applying deep learning-based image processing techniques to existing encoding techniques, in particular, compression techniques such as inter prediction, intra prediction, in-loop filter, transform, etc. Representative application examples include inter prediction based on virtual reference frames generated by deep learning models and include in-loop filter based on denoising models. Therefore, deep learning-based image processing technology needs to be employed further to improve the coding efficiency in image encoding/decoding.

SUMMARY

The present disclosure in some embodiments seeks to provide a video coding method and an apparatus for generating refined prediction signals approximating original video signals from predicted signals of intra prediction using a variable and fixed coefficient-based deep learning model to reduce the amount of data for residual signals, which are to be encoded.

At least one aspect of the present disclosure provides a video decoding apparatus. The apparatus comprises an entropy decoder configured to decode an intra prediction mode and residual values of a current block from a bitstream, decode a refinement flag, or determine the refinement flag. The refinement flag indicates whether to apply a deep learning-based refinement model at the time of intra prediction of the current block. The apparatus also comprises an intra predictor configured to generate a prediction block of the current block using the intra prediction mode. The apparatus also comprises a signal refinement unit configured to generate a refined prediction block from the prediction block using the refinement model when the refinement flag is 1. The apparatus also comprises an adder configured to generate a restored block of the current block by adding the residual values to the refined prediction block when the refinement flag is 1 or generate the restored block by adding the residual values to the prediction block when the refinement flag is 0.

Another aspect of the present disclosure provides a video decoding method performed by a video decoding apparatus for intra prediction of a current block. The method comprises decoding an intra prediction mode and residual values of the current block from a bitstream, decoding a refinement flag, or determining the refinement flag. The refinement flag indicates whether to apply a deep learning-based refinement model at the time of intra prediction of the current block. The method also comprises generating a prediction block of the current block using the intra prediction mode. The method also comprises generating a restored block of the current block based on the refinement flag. When the refinement flag is 1, generating the restored block includes generating a refined prediction block from the prediction block using the refinement model and generating the restored block by adding the residual values to the refined prediction block. When the refinement flag is 0, generating the restored block includes generating the restored block by adding the residual values to the prediction block.

Yet another aspect of the present disclosure provides a video encoding method performed by a video encoding apparatus for intra prediction of a current block. The method comprises obtaining an intra prediction mode of the current block, obtaining a refinement flag, or determining the refinement flag. The refinement flag indicates whether to apply a deep learning-based refinement model at the time of intra prediction of the current block. The method also comprises generating a prediction block of the current block using the intra prediction mode. The method also comprises generating a residual block of the current block based on the refinement flag. When the refinement flag is 1, generating the residual block includes generating a refined prediction block from the prediction block using the refinement model and generating the residual block by subtracting the refined prediction block from the current block. When the refinement flag is 0, generating the residual block includes generating the residual block by subtracting the prediction block from the current block.

As described above, the present disclosure provides a video coding method and an apparatus for generating refined prediction signals approximating original video signals from predicted signals of intra prediction using a variable and fixed coefficient-based deep learning model to reduce the amount of data for residual signals, which are to be encoded, and to improve the coding efficiency.

DETAILED DESCRIPTION

Figure 1:
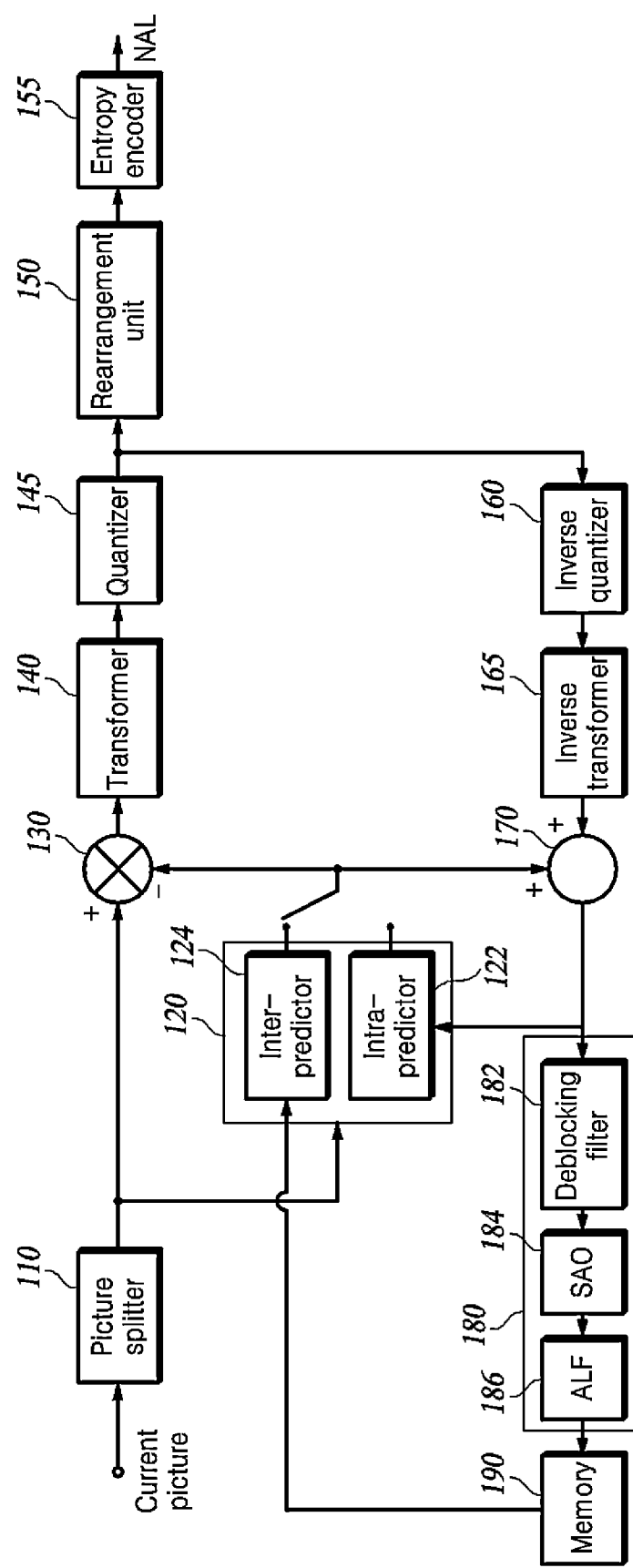
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
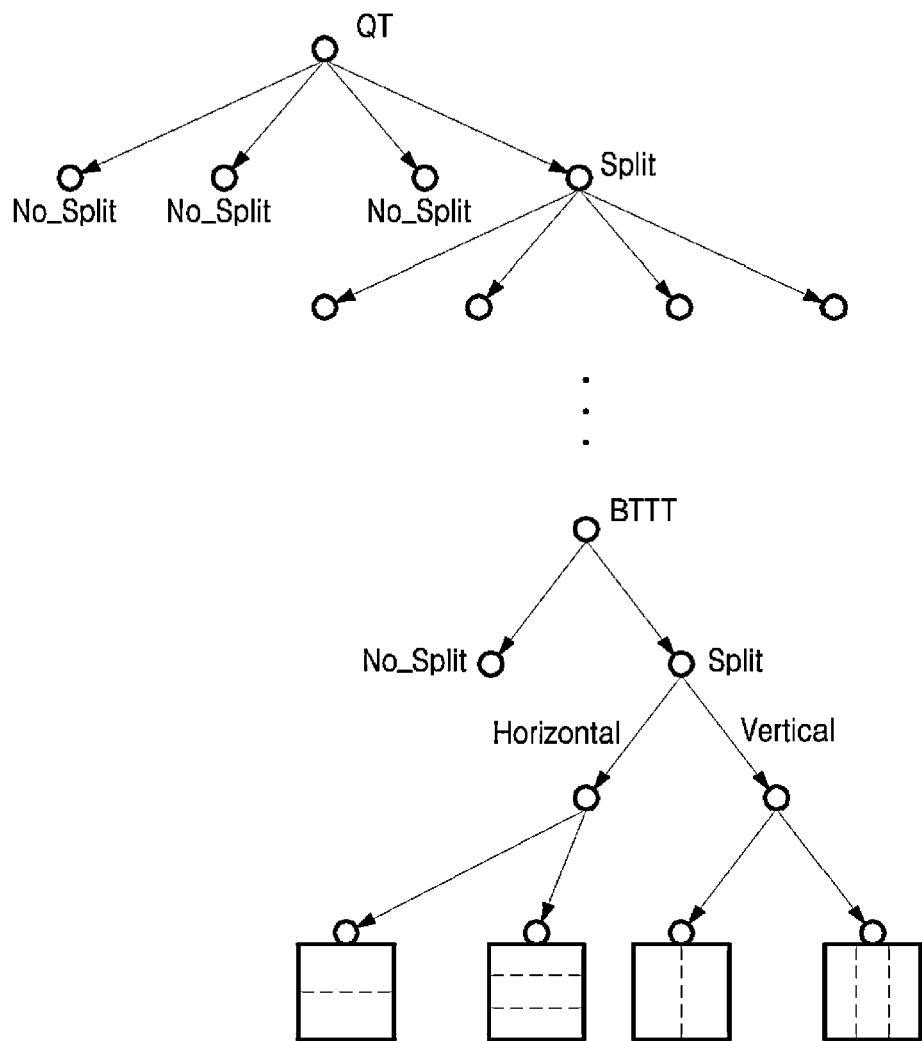
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
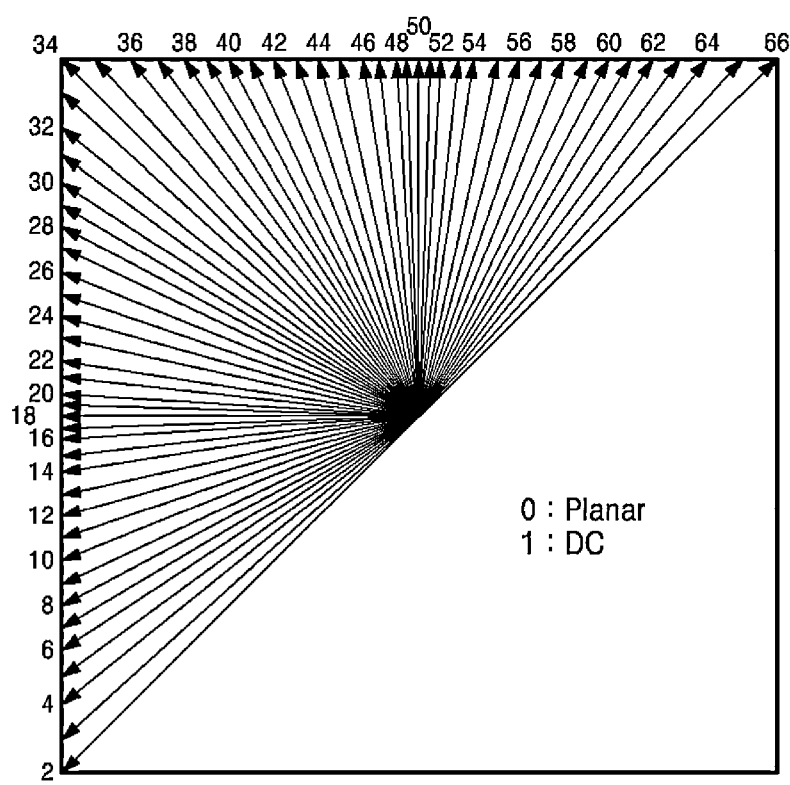
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
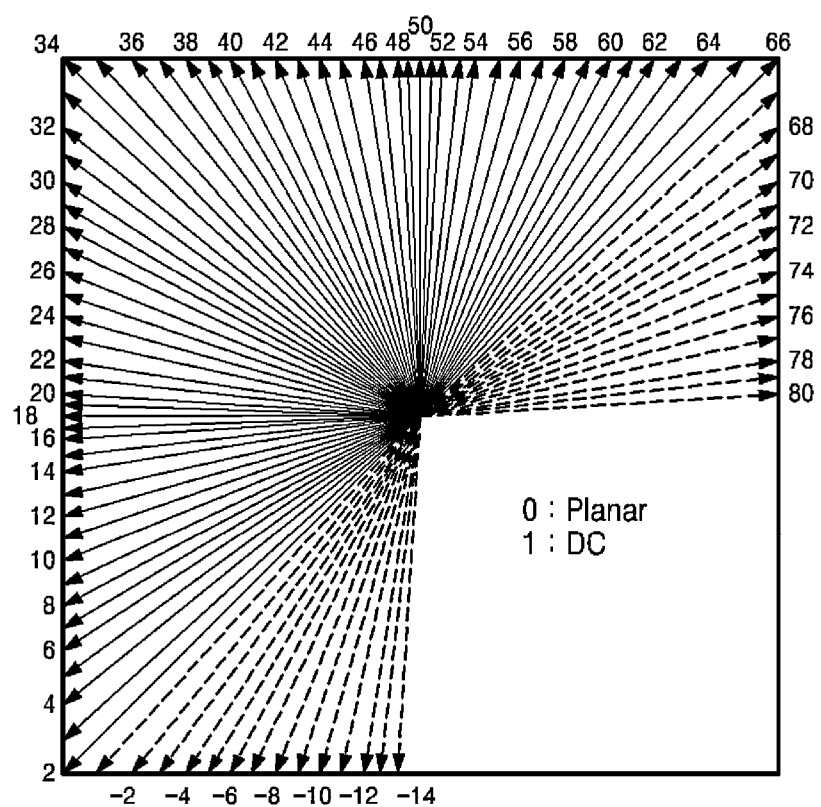

For efficient directional prediction for the current block having the rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
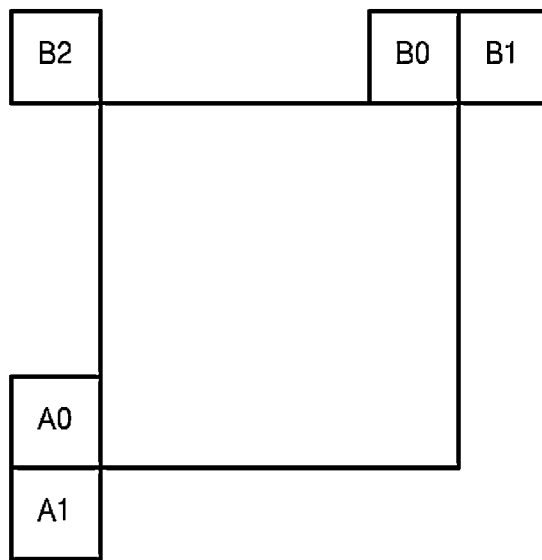
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
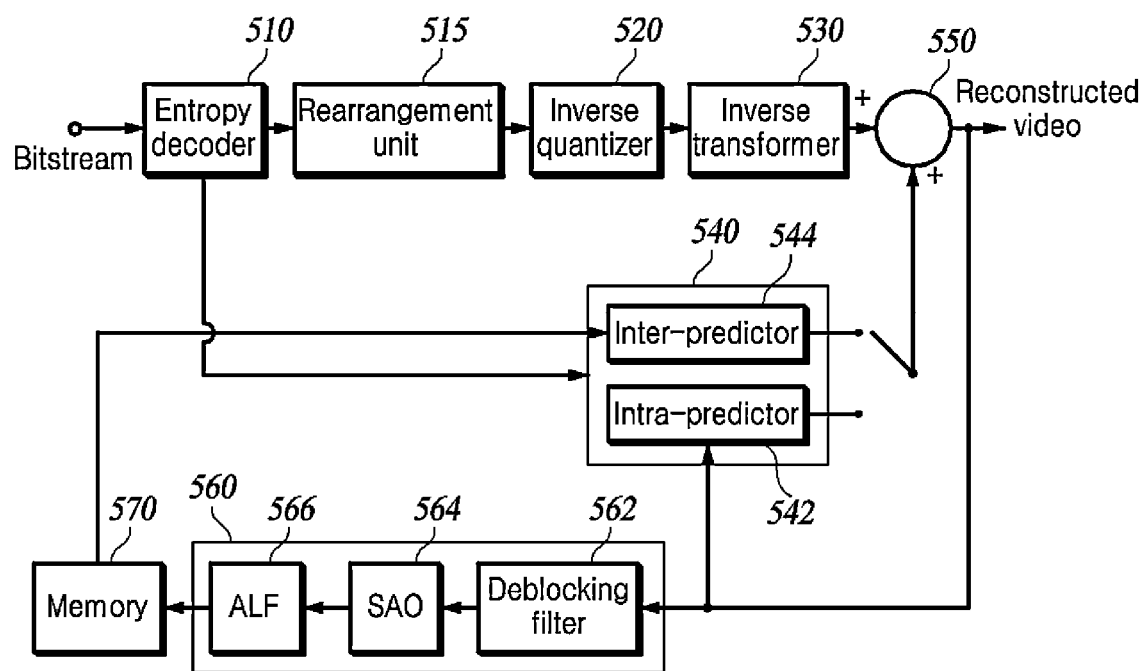
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding.

The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for generating refined prediction signals approximating original video signals from predicted signals of intra prediction using a variable and fixed coefficient-based deep learning model.

The embodiments below may be commonly applied to cases involving deep learning techniques for video encoding and decoding apparatuses.

In the following descriptions, the term 'target block' to be encoded/decoded may be used interchangeably with the current block or coding unit (CU) as described above, or it may refer to some area of the coding unit.

I. Encoding Mode of Intra Prediction

As described above, intra prediction is a method of predicting a current block by referring to samples located around a current target block of encoding. As shown in FIGS. 3A and 3B, the Versatile Video Coding (VVC) technique may use the non-directional prediction modes of DC/planar mode, 65 directional prediction modes, and wide angle intra prediction modes. Also, intra prediction may utilize prediction techniques, such as the multiple reference line intra prediction (MRLP), cross-component linear model (CCLM), position dependent intra prediction combination (PDPC), intra sub-partitions (ISP), and matrix-weighted intra prediction (MIP).

In an intra prediction process using MRLP, a video encoding/decoding apparatus may use multiple reference lines (MRL) to employ more reference lines. When MRL is applied, the video encoding/decoding apparatus may perform intra prediction on the current block using samples of two lines added on the top and left of the current block in addition to the original reference line. When applying MRL, an index (mrl_idx) indicating a reference line may be signaled to the video decoding apparatus to select a reference line.

CCLM prediction is an intra prediction method using a linear model representing a similarity between luma signals and chroma signals. To activate the CCLM mode, the encoding apparatus may signal a flag for activating the CCLM mode to the video decoding apparatus.

The CCLM prediction first derives a linear transformation function between neighboring reference samples and luma signal reference samples located at the same positions as the neighboring reference samples based on the current chroma block. At this time, the linear transformation function may be derived based on the minimum value of the neighboring luma signals, chroma values co-located with the neighboring luma signals, the maximum value of the neighboring luma signals, and chroma values co-located with the neighboring luma signals. Next, prediction on chroma samples is performed by applying the linear transformation function to the luma samples co-located with the chroma block.

One of the rule-based prediction methods used for intra prediction is Position Dependent Intra Prediction Combination (PDPC). In other words, a predictor may be generated based on a predefined operation using encoding information of a target block on which intra prediction is performed and neighboring pixels spatially adjacent to the target block.

The PDPC modifies predicted samples generated according to specific intra prediction modes to generate an intra predictor of a current block. Here, the specific intra prediction modes include the planar mode, DC mode, horizontal mode (prediction mode 18), vertical mode (prediction mode 50), lower-left diagonal directional mode (prediction mode 2) and 15 directional modes close to the lower-left diagonal directional mode, and upper-right diagonal directional mode (prediction mode 66) and 15 directional modes close to the upper-right diagonal directional mode.

For prediction samples of a current block generated according to a specific intra prediction mode, the PDPC technique may adjust each pixel value to generate the prediction sample using predefined weights and position information of neighboring pixels.

As described above, the intra prediction mode of the luma block has subdivided directional modes (i.e., −14 to 80) in addition to non-directional modes (i.e., Planar and DC), as shown in FIGS. 3A and 3B. After subpartitioning the current block into small blocks of the same size, the ISP technique shares the intra prediction of the current block across the entire subblocks, however, a different transformation may be applied to each subblock. At the time of subpartitioning, a block may be partitioned in the horizontal or vertical direction.

A predictor may be generated based on a predefined matrix operation using pixels adjacent to a current block for which intra prediction is performed and encoding information of the current block. The rule-based prediction method above is called Matrix weighted Intra Prediction (MIP).

The MIP generates all or part of intra predictors using predefined matrix operations. When a portion of the predictors is generated, MIP may generate final intra predicted samples equal to the size of the current block by additionally performing interpolation for upsampling or upscaling using part of the predictors.

Meanwhile, the MIP may selectively choose a portion of pixels among pixels spatially adjacent to the current block and use the selected pixels as neighboring pixels of the current block. As another embodiment, the MIP may use values derived according to an operation based on a method such as subsampling or downscaling for matrix operations.

Figure 6:
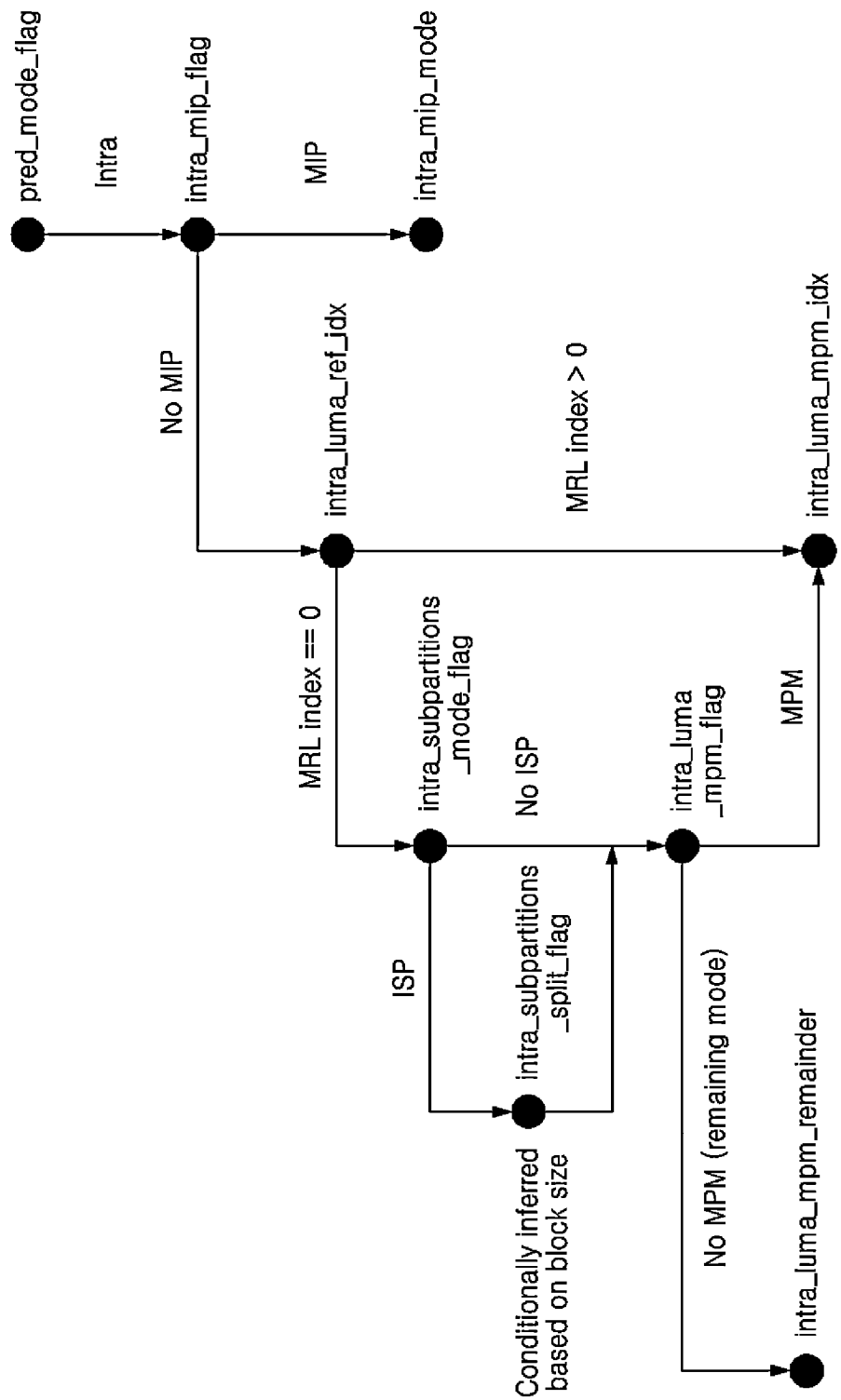
FIG. 6 illustrates transmission of an encoding mode of intra prediction.

The prediction mode of intra prediction and whether the prediction technique is applied may be signaled from the video encoding apparatus to the video decoding apparatus according to the method for transmitting the encoding mode of intra prediction, as illustrated in FIG. 6. For example, when the current block is coded with intra prediction, the video encoding apparatus may signal pred_mode_flag as 0 and then may signal whether the MIP technique is applied using intra_mip_flag.

In the example of FIG. 6, the most probable mode (MPM) technique uses the intra prediction mode of a neighboring block when performing intra prediction of a current block. The video encoding apparatus may improve the coding efficiency of the intra prediction mode by transmitting the index of an MPM list instead of the index of the prediction mode. Meanwhile, the example of FIG. 6 does not provide a detailed description of a method for signaling an encoding mode to which MIP is not applied.

Meanwhile, intra block copy (IBC) technique generates a reference block within the same picture as a prediction block of a current block instead of using reference samples when performing intra prediction. At this time, a block vector represents a displacement indicating the reference block and is signaled from the video encoding apparatus to the video decoding apparatus.

II. Matrix-Based Intra-Cross-Component Prediction

Figure 7:
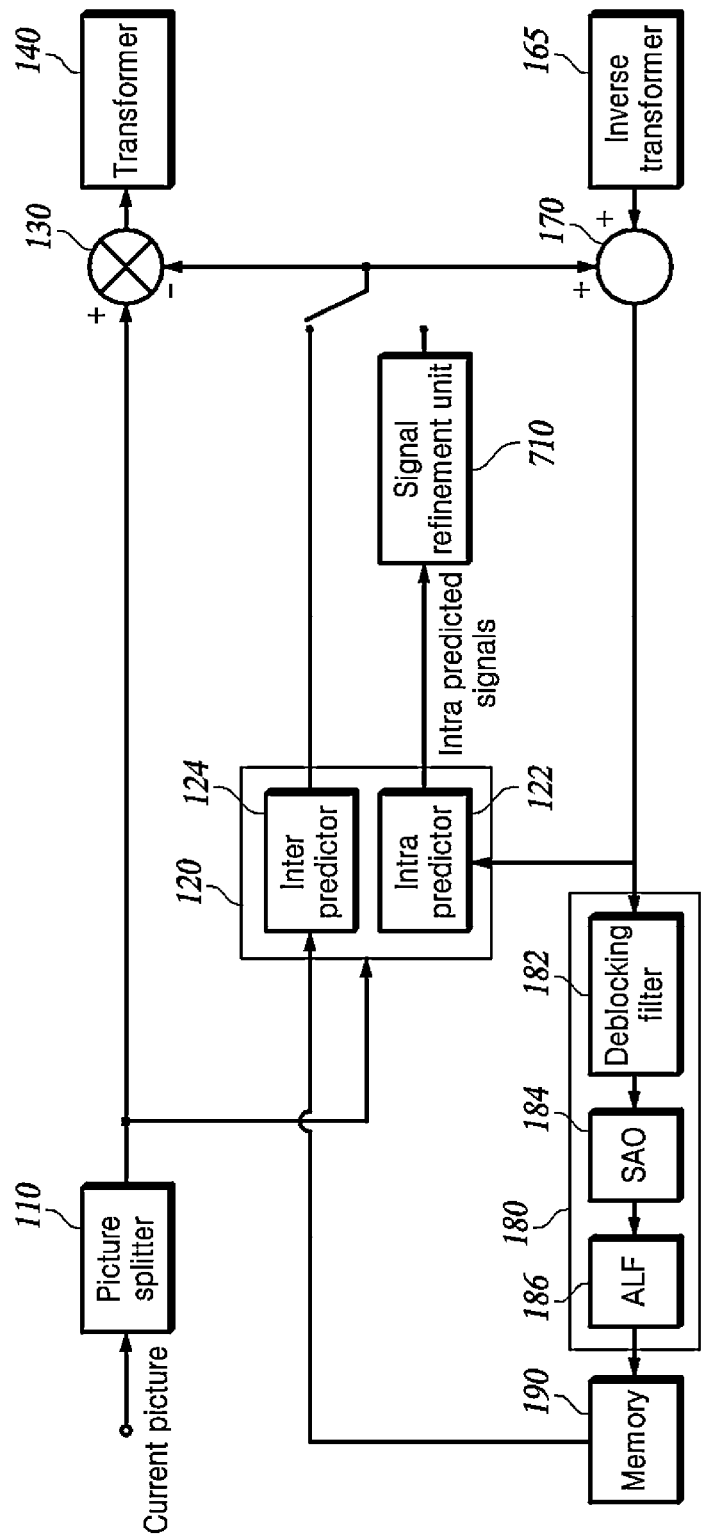
FIG. 7 illustrates a block diagram of a video encoding apparatus using refinement of an intra predicted signals according to one embodiment of the present disclosure.

FIG. 7 illustrates a block diagram of a video encoding apparatus using refinement of an intra predicted signals according to one embodiment of the present disclosure.

The video encoding apparatus according to the present embodiment additionally includes a signal refinement unit 710 after the intra predictor 122, which is one of the basic constituting elements. Here, constituting elements included in the video encoding apparatus according to the present embodiment are not necessarily limited to the specific example. For example, the video encoding apparatus may additionally include a training unit (not shown) for training a deep learning-based refinement model included in the signal refinement unit 710 or may be implemented to operate in conjunction with an external training unit.

The intra predictor 122 generates a prediction block that includes a predicted signals for a current target block to be encoded from neighboring reference samples using a prediction mode.

The video encoding apparatus may use a refinement flag refinement_flag to indicate application of a refinement model to the prediction block. The video encoding apparatus may transmit the refinement flag to the video decoding apparatus per block basis or may transmit the refinement flag per picture or slice basis after including the refinement flag in the SPS.

When the refinement flag is 1, the signal refinement unit 710 generates a refined prediction block from the prediction block using a refinement model. Meanwhile, the training unit may train the refinement model so that the refinement model learns a signal generation method to generate a refined signals approximating the original signal of the current block.

In the following descriptions, the term 'refined prediction model' may be used interchangeably with the term 'refined block'.

The video encoding apparatus generates a residual block by subtracting a refined block from the current block when the refinement flag is 1 and generates a residual block by subtracting a predicted block from the current block when the refinement flag is 0. The video encoding apparatus may perform the above encoding process by inputting the residual values of the residual block to the transformer 140.

Meanwhile, as an example, the video encoding apparatus may set the value of the refinement flag as follows. After determining the number N of intra prediction modes (where N is a natural number) based on the size of the current block, the video encoding apparatus determines N candidate prediction modes by performing Rough Mode Decision (RMD) on the current block. The video encoding apparatus generates a prediction block for each prediction mode using the prediction modes included in the MPM and the N candidate prediction modes and then calculates the rate distortion cost (RD-cost) for each prediction block. Also, the video encoding apparatus generates a refined prediction block by applying the refinement model to each prediction block and then calculates a rate distortion cost for each refined prediction block. The video encoding apparatus may compare the rate distortion cost between the refined block and the prediction block, determine the corresponding candidate prediction mode as the intra prediction mode of the current block when the cost of using the refined block becomes minimum, and set the refinement flag refinement_flag to 1.

Figure 8:
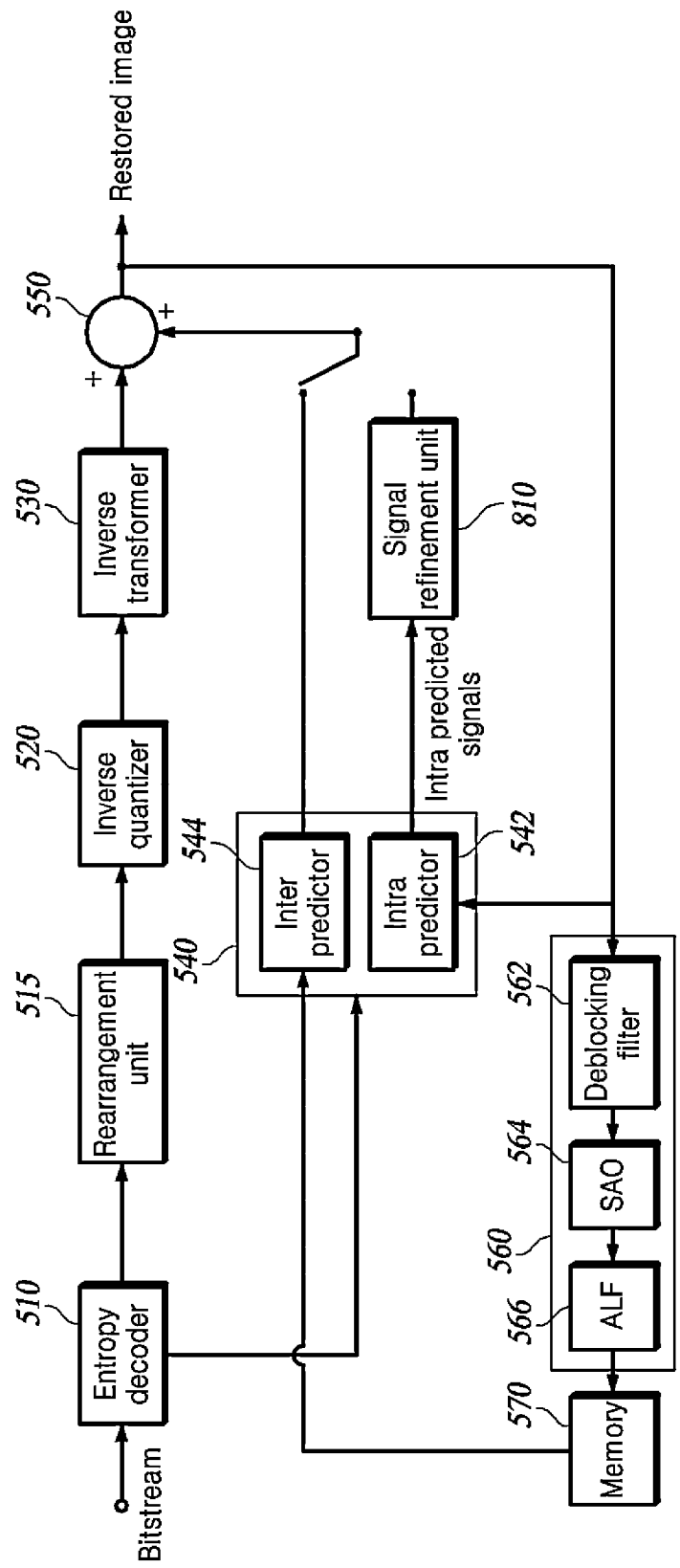
FIG. 8 illustrates a block diagram of a video decoding apparatus using refinement of an intra predicted signals according to one embodiment of the present disclosure.

FIG. 8 illustrates a block diagram of a video decoding apparatus using refinement of an intra predicted signals according to one embodiment of the present disclosure.

The video decoding apparatus according to the present embodiment additionally includes a signal refinement unit 810 after the intra predictor 122, which is one of the basic constituting elements.

The entropy decoder 510 decodes the intra prediction mode of a current block to be decoded, the refinement flag refinement_flag, and the residual block including residual values from a bitstream.

The intra predictor 542 generates a prediction block that includes predicted signals for the current block to be decoded from neighboring reference samples using an intra prediction mode.

When the refinement flag is 1, the signal refinement unit 810 generates a refined block from the prediction block using a refinement model. The video decoding apparatus generates a restored block for the current block by adding residual values to the refined block when the refinement flag is 1 and generates a restored block for the current block by adding residual values to the prediction block when the refinement flag is 0.

In the following descriptions, a refinement model within the video encoding apparatus is described. The following descriptions may be equally applied to the refinement model used in the video decoding apparatus.

In one embodiment, the refinement model may be a deep learning model implemented using convolution layers that include only fixed coefficients (in the descriptions below, 'fixed coefficient-based network'). The fixed coefficient-based network may be used to refine an input block to approximate the original block. As the training unit trains a deep learning model having a relatively large number of parameters in advance using various input data, a refinement model that includes the fixed coefficient network may be implemented.

Figure 9:
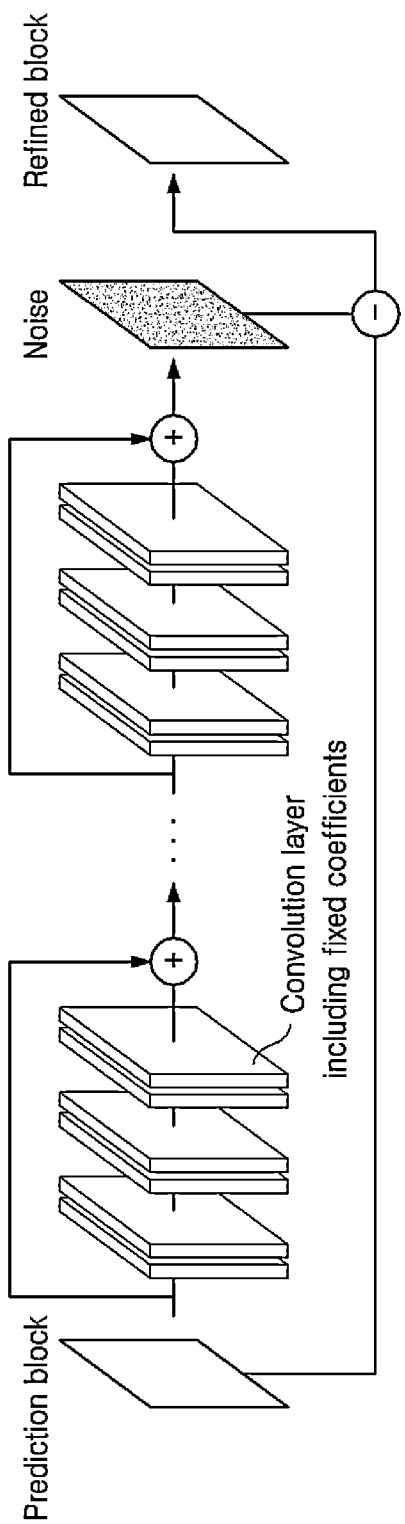
FIG. 9 illustrates a refinement model including a fixed coefficient network according to one embodiment of the present disclosure.

The refinement model that includes the fixed coefficient-based network may be implemented based on a noise prediction method. For example, as shown in FIG. 9, the refinement model may generate refinement signals by estimating noise in the prediction block and removing the estimated noise from the prediction block.

Figure 10:
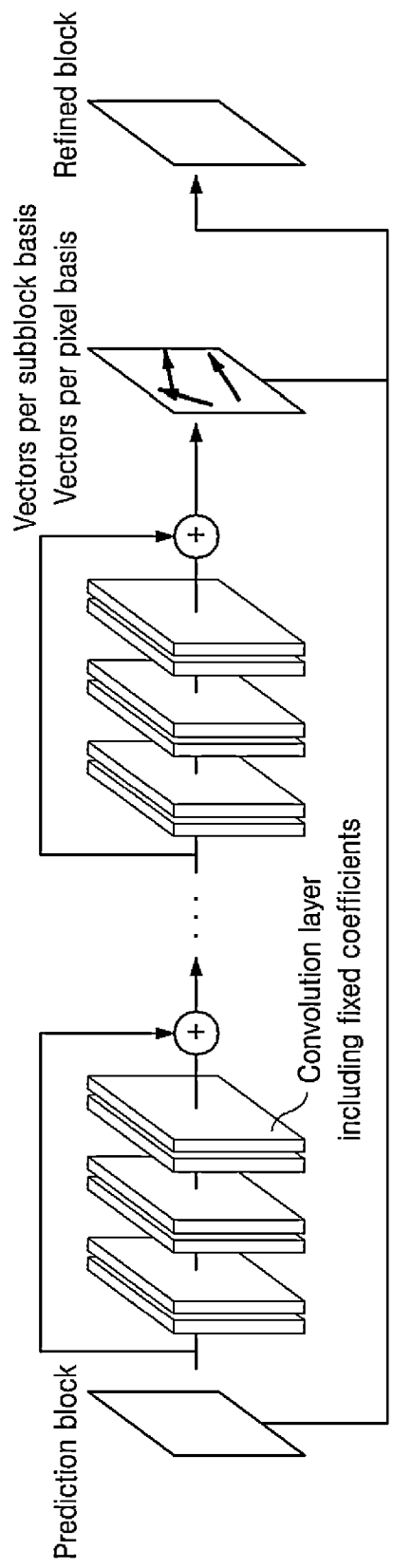
FIG. 10 illustrates a refinement model including a fixed coefficient network according to another embodiment of the present disclosure.

Alternatively, the refinement model may use a method of generating refined signals using neighboring pixel values. For example, the refinement model may use a block indicated by a block vector according to the application of IBC as a prediction block of the current block and may generate refined signals from the prediction block. Also, as illustrated in FIG. 10, the refinement model may use a prediction block found by the block vector as an input to generate additional vectors per subblock basis or pixel basis and generate refined signals using the vectors.

Alternatively, the refinement model may pad adjacent reference samples used for intra prediction of the current block to use as input and generate refined signals according to the input.

Figure 11:
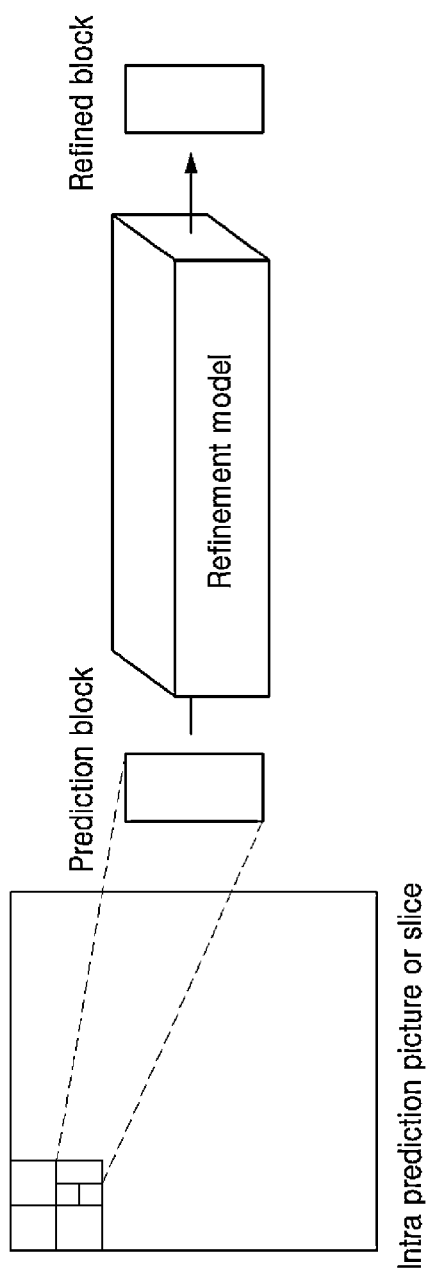
FIG. 11 illustrates the operation of a refinement model according to one embodiment of the present disclosure.

Meanwhile, as shown in FIG. 11, the input to the refinement model is a prediction block obtained according to a specific mode, and the output of the refinement model corresponds to a refined prediction block. Here, the specific mode may be an arbitrary prediction mode used for intra prediction or a combination of the prediction modes.

Alternatively, the input may be composed of a weighted sum of a prediction block according to the prediction mode used for intra prediction and a prediction block according to inter prediction. The refinement model may generate refined signals from the input.

The video encoding apparatus determines whether to refine a prediction block by comparing the rate distortion costs between the prediction block according to an existing encoding mode and the refined block. Afterwards, as described above, the video decoding apparatus adds the refinement flag refinement_flag, which indicates whether to refine the prediction signal, and signals the refinement flag to the video decoding apparatus. When the rate distortion cost of the refined block is less than that of the prediction block, the video encoding apparatus may set the refinement flag refinement_flag to 1.

The rate distortion cost $J_{RD}$ may be calculated by Eq. 1 below.

$$J_{RD}=SSD(S,C)+\lambda \cdot R \quad [\text{Eq. 1}]$$

In Eq. 1, S represents the original block, and C represents a restored block, which may be the prediction block or the refined prediction block. The Sum of Squared Difference (SSD) represents the similarity between the original block and the restored block. R represents the estimated bitrate, and A represents the Lagrange multiplier.

Meanwhile, the parameters of the fixed coefficient-based network are shared between the video encoding apparatus and the video decoding apparatus.

In another embodiment, the refinement model may be a deep learning model implemented using a fixed coefficient-based network and convolution layers that include only variable coefficients (in the descriptions below, 'variable coefficient-based network'). The variable coefficient-based network may be implemented with a relatively small number of parameters since network parameters have to be transmitted. As the training unit trains the deep learning model during encoding of the original block while fixing the pre-trained fixed coefficient-based network, a refinement model including the variable coefficient-based network may be implemented.

Figure 12:
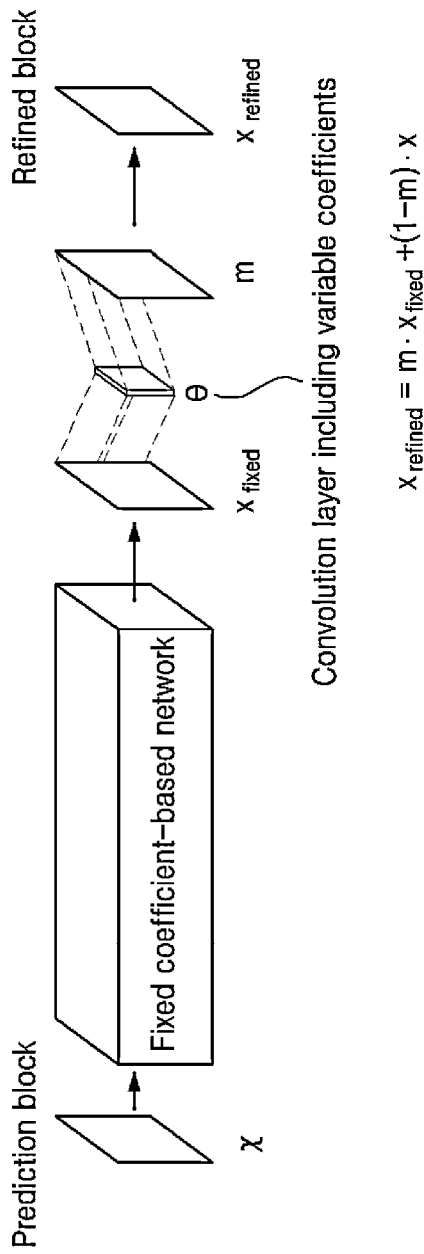
FIG. 12 illustrates a refinement model including a variable coefficient network according to one embodiment of the present disclosure.

The refinement model including the variable coefficient-based network may use a mask map. A mask map is a vector or a variable that generates a refined block $x_{refined}$ by performing an appropriate operation on the output signal x fixed of the fixed coefficient-based network. For example, as shown in FIG. 12, the fixed coefficient-based network of the refinement model generates the output signal $x_{fixed}$, and the variable coefficient-based network of the refinement network generates a mask map m. The refinement model uses the mask map to perform a weighted sum of the output signal $x_{fixed}$ and the prediction block x, thereby generating the refined block $x_{refined}$.

Figure 13:
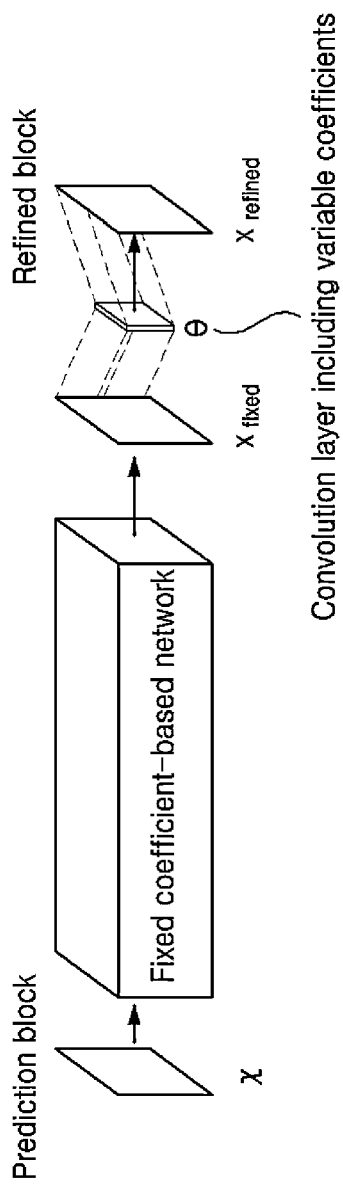
FIG. 13 illustrates a refinement model including a variable coefficient network according to another embodiment of the present disclosure.

Alternatively, the refinement model may use the variable coefficient-based network composed of a plurality of convolution layers. For example, as shown in FIG. 13, the fixed coefficient-based network of the refinement model may generate the output signal $x_{fixed}$, and the variable coefficient-based network of the refinement model may generate the refined block $x_{refined}$ from the output signal $x_{fixed}$.

The video encoding apparatus may calculate the rate distortion cost $J_{RD}$ by considering the bitrate R' related to the variable coefficient-based network parameters, as shown in Eq. 2.

$$J_{RD}=SSD(S,C)+\lambda \cdot (R+R') \quad [\text{Eq. 2}]$$

For example, a variable coefficient-based network composed of a convolutional layer with a 3×3 kernel requires a total of 10 parameters, including a bias parameter. Therefore, when parameters are transmitted using a 16-bit floating point type (float 16 type), a total of 160 bits are additionally required.

Meanwhile, the parameters θ of the variable coefficient-based network needs to be transmitted from the video encoding apparatus to the video decoding apparatus. The transmission period may be determined by taking into account the size of the parameters. For example, the parameters θ may be transmitted every Intra frame (I frame) in which the parameter is refreshed.

Meanwhile, as described above, the video encoding apparatus may explicitly transmit the refinement flag refinement_flag using a bitstream. When refinement_flag=1, the video decoding apparatus may generate a refined block by applying a refinement model to the prediction block. On the other hand, when refinement_flag=0, the video decoding apparatus may skip the application of the refinement model and perform conventional intra prediction. As described above, the video encoding apparatus may transmit the refinement flag per block basis, or per video sequence or slice basis. In the case of transmission per block basis, the video encoding apparatus may additionally use a higher-level flag that indicates the existence of a refinement flag per block basis.

As another example, the refinement flag refinement_flag may be determined implicitly. When it is determined that refinement_flag=1, the video decoding apparatus may generate a refined block by applying the refinement model to the prediction block. On the other hand, when it is determined that refinement_flag=0, the video decoding apparatus may skip the application of the refinement model and perform conventional intra prediction.

The method for implicitly determining the refinement flag may employ one of the following methods.

In one method, intra prediction is selected as a specific mode. For example, when the intra prediction mode is Planar, the refinement flag may be implicitly determined to be 1.

When intra prediction employs the MIP mode or the PDPC mode rather than a conventional intra prediction mode, the refinement flag may be implicitly determined to be 1.

When intra prediction based on the MRLP is used, and reference samples in the immediately adjacent row or column are not used, the refinement flat may be implicitly determined to be 1.

When reference samples are unavailable in the directly adjacent row or column for intra prediction, the refinement flag may be implicitly determined to be 1.

When the ISP mode is applied for intra prediction, the refinement flag may be implicitly determined to be 1.

The refinement model as described above receives prediction signals only and performs signal refinement. As another embodiment, to achieve the same goal of improving the prediction signals, a refinement model may be applied by using input from one or a combination of residual signals obtained after prediction, signals of a neighboring block, or signals obtained by applying two or more distinct prediction modes.

On the other hand, as described above, refinement of a prediction block according to the present embodiment may refine a prediction block based on the conventional intra prediction mode. Also, a prediction signal refinement mode may be added as a new prediction mode for video encoding.

First, refinement of a prediction block according to the conventional intra prediction mode may be performed as follows.

The video encoding apparatus may generate a refined prediction block by applying a refinement model according to the present embodiment to a prediction block obtained by first performing all or part of the prediction modes available for encoding. For example, the video encoding apparatus may generate a refined prediction block by applying the refinement model to a prediction block obtained by executing the DC/Planar non-directional prediction mode, 65 directional prediction modes, the ISP mode, the MIP mode, and the like.

Alternatively, the video encoding apparatus may perform prediction block refinement on one or two or more selected prediction modes at the time of encoding. For example, the video encoding apparatus may perform prediction block refinement on the prediction blocks obtained from 65 directional prediction modes.

Alternatively, the video encoding apparatus may perform prediction block refinement on the blocks with the PU sizes larger than or equal to, or smaller than or equal to, a predetermined threshold.

The refinement of prediction blocks according to the conventional intra prediction mode described above may be performed similarly in the video decoding apparatus.

Next, the video encoding apparatus may add a prediction signal refinement mode as a new mode.

When a prediction signal refinement mode is added as a new encoding mode, the video encoding apparatus may select the corresponding mode according to a result of comparing the rate distortion cost with that of the existing modes. For example, the prediction signal refinement mode may be added to existing intra prediction coding modes such as the non-directional prediction mode, directional prediction mode, ISP, and MIP. When the prediction signal refinement mode is applied, the video encoding apparatus may selectively use reference samples in one direction or an arbitrary direction among the directional prediction modes to generate a prediction block. Then, the video encoding apparatus may generate a refined prediction block by applying a prediction signal refinement model.

The prediction signal refinement mode described above may be applied similarly to the video decoding apparatus.

In the following descriptions, a video encoding method and a video decoding method using refinement of intra prediction signals are described with reference to FIGS. 14 and 15.

Figure 14:
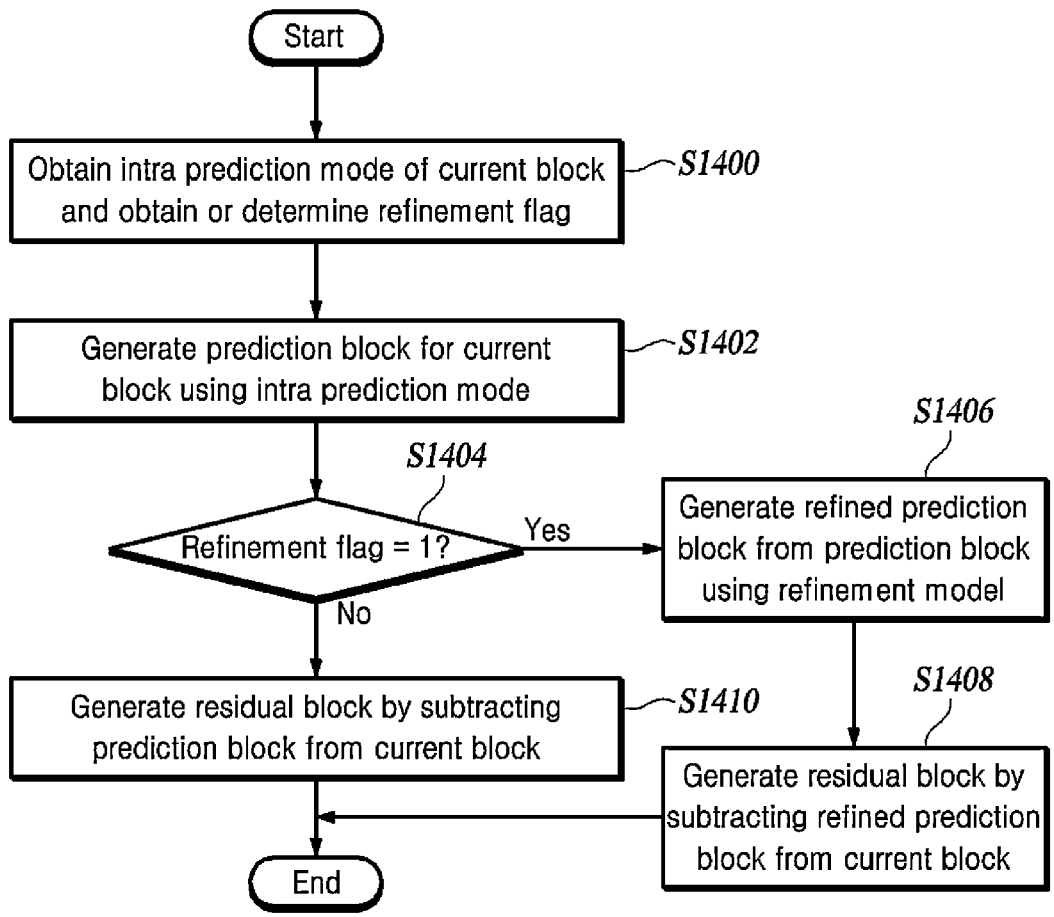
FIG. 14 is a flow diagram illustrating a video encoding method using refinement of an intra predicted signals according to one embodiment of the present disclosure.

FIG. 14 is a flow diagram illustrating a video encoding method using refinement of an intra predicted signals according to one embodiment of the present disclosure.

The video encoding apparatus obtains an intra prediction mode of a current block and obtain or determine a refinement flag (S1400). Here, the refinement flag refinement_flag indicates whether to apply a deep learning-based refinement model when intra prediction of the current block is performed. The video encoding apparatus may transmit the refinement flag to the video decoding apparatus per block basis or may transmit the refinement flag per picture or slice basis after including the refinement flag in the SPS.

In one example, the video decoding apparatus may obtain the value of the refinement flag set as follows. The video decoding apparatus compares rate distortion costs between a refined block and a prediction block for a plurality of candidate intra prediction modes. When using the refined block yields the minimum cost, the video encoding apparatus determines the corresponding candidate prediction mode as the intra prediction mode of the current block and set the refinement flag as 1.

In another example, the video encoding apparatus may implicitly determine the value of the refinement flag as follows. The video encoding apparatus may determine the refinement flag to be 1 when intra prediction of the current block employs a predetermined prediction mode (e.g., Planar). The video encoding apparatus may determine the refinement flag to be 1 when intra prediction of the current block employs the MIP or PDPC mode. Also, the video encoding apparatus may determine the refinement flag to be 1 when intra prediction of the current block employs a plurality of reference lines but does not use the reference samples of a row or column directly adjacent to the current block. The video encoding apparatus may determine the refinement flag to be 1 when reference samples are unavailable in the neighboring row or column. Also, when intra prediction of the current block employs the ISP mode, the video encoding apparatus may determine the refinement flag to be 1.

The video encoding apparatus generates a prediction block for the current block using the intra prediction mode (S1402).

The video encoding apparatus check the value of the refinement flag (S1404).

When the refinement flag is 1 (Yes in S1404), the video encoding apparatus generates a refined prediction block from a prediction block using the refinement model (S1406) and then generates a residual block by subtracting the refined prediction block from the current block (S1408).

The input to the refinement model is a prediction block obtained according to a specific mode, and the output of the refinement model corresponds to the refined prediction block. Here, the specific mode may be an arbitrary prediction mode used for intra prediction or a combination of the prediction modes.

In one embodiment, the refinement model may be a deep learning model including only the fixed coefficient-based network. The refinement model including the fixed coefficient-based model is pre-trained to generate a refined prediction block approximating the original image of the current block. The parameters of the fixed coefficient-based network are shared between the video encoding apparatus and the video decoding apparatus.

In another example, the refinement model may be a deep learning model that includes a fixed coefficient-based network and a variable coefficient-based network. In the case of the refinement model including the variable coefficient-based network, the variable coefficient-based network is trained while the fixed coefficient-based network is fixed when the original image of the current block is encoded. Meanwhile, the video encoding apparatus may encode the parameters of the variable coefficient-based network and then may transmit the parameters to the video decoding apparatus. The transmission period may be determined by taking into account the size of the parameters. For example, the parameters may be transmitted every Intra frame (I frame) in which the parameter is refreshed.

Meanwhile, when the refinement flag is 0 (No in S1404), the video encoding apparatus generates a residual block by subtracting the prediction block from the current block (S1410).

Afterwards, the video encoding apparatus may perform the process of encoding residual values of the residual block.

Figure 15:
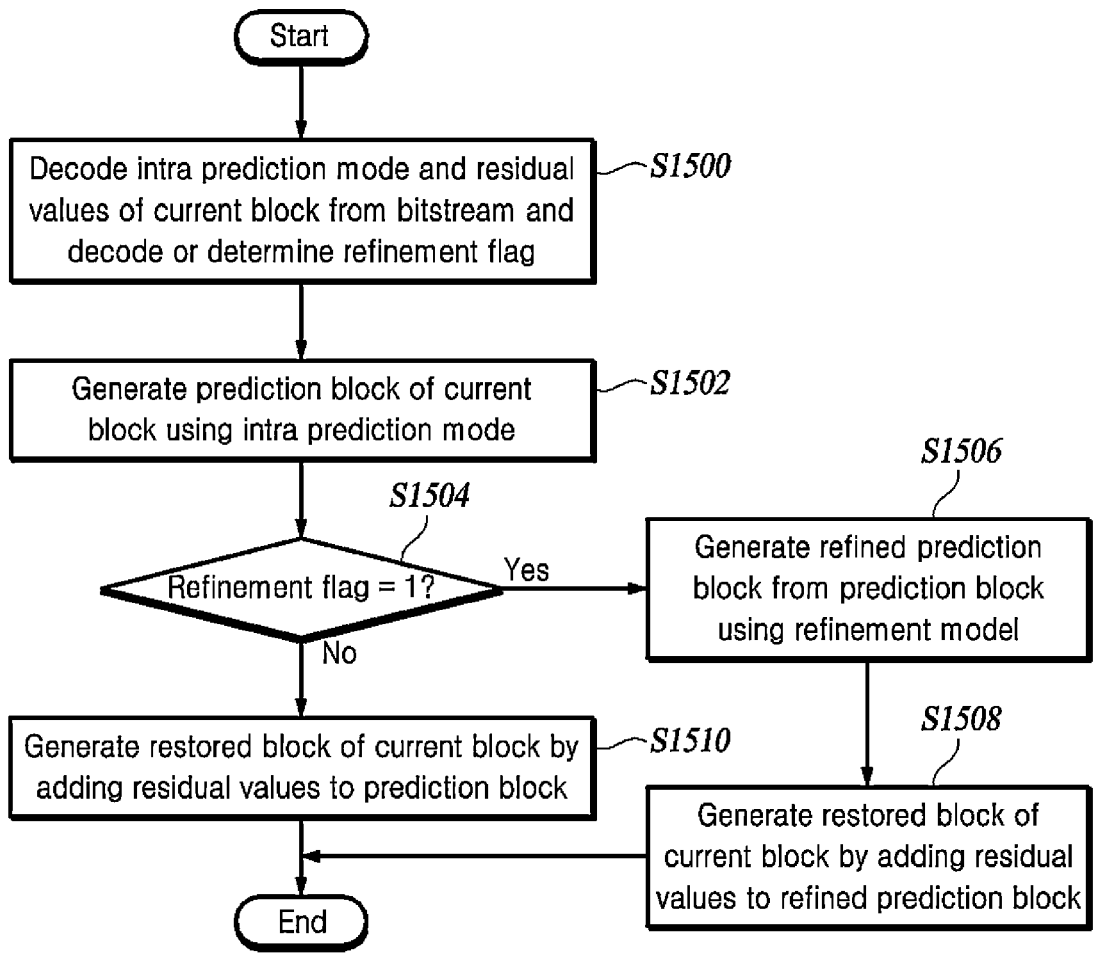
FIG. 15 is a flow diagram illustrating a video decoding method using refinement of an intra predicted signals according to one embodiment of the present disclosure.

FIG. 15 is a flow diagram illustrating a video decoding method using refinement of an intra predicted signals according to one embodiment of the present disclosure.

The video decoding apparatus decodes the intra prediction mode of the current block and residual values from a bitstream and decodes or determines the refinement flag (S1500). Here, the refinement flag refinement_flag indicates whether to apply a deep learning-based refinement model when intra prediction of the current block is performed.

As described above, the refinement flag may be transmitted per block basis from the video encoding apparatus or transmitted per video sequences or slice basis.

As another example, the video decoding apparatus may implicitly determine the value of the refinement flag similarly to the operation of the video encoding apparatus.

The video decoding apparatus generates a prediction block for the current block using the intra prediction mode (S1502).

The video decoding apparatus checks the value of the refinement flag (S1504).

When the refinement flag is 1 (Yes in S1504), the video decoding apparatus generates a refined prediction block from a prediction block using the refinement model (S1506) and then generates a restored block of the current block by adding residual values to the refined prediction block (S1508).

The refinement model may be a deep learning model including only the fixed coefficient-based network. As described above, the parameters of the fixed coefficient-based network are shared between the video encoding apparatus and the video decoding apparatus.

In another example, the refinement may be a deep learning model that includes a fixed coefficient-based network and a variable coefficient-based network. In the case of a deep learning model including the variable coefficient-based network, the video decoding apparatus decodes the parameters of the variable coefficient-based network from a bitstream.

Meanwhile, when the refinement flag is 0 (No in S1504), the video decoding apparatus generates a restored block of the current block by adding residual values to the prediction block (S1510).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure should not be limited by the above explicitly described embodiments but by the claims and equivalents thereof.

REFERENCE NUMERALS

122: intra predictor
510: entropy decoder
542: intra predictor
710: signal refinement unit
810: signal refinement unit

What is claimed is:

1. A video decoding apparatus comprising:
an entropy decoder configured to decode an intra prediction mode and residual values of a current block from a bitstream, decode a refinement flag, or determine the refinement flag, wherein the refinement flag indicates whether to apply a deep learning-based refinement model at a time of intra prediction of the current block;
an intra predictor configured to generate a prediction block of the current block using the intra prediction mode;
a signal refinement unit configured to generate a refined prediction block from the prediction block using the refinement model when the refinement flag is 1; and
an adder configured to generate a restored block of the current block by adding the residual values to the refined prediction block when the refinement flag is 1 or generate the restored block by adding the residual values to the prediction block when the refinement flag is 0,
wherein the refinement model is implemented using a deep learning model including a fixed coefficient-based network and is pre-trained to generate a refined prediction block approximating an original image of the current block.

2. The apparatus of claim 1, wherein the deep learning model further includes a variable coefficient-based network, and the variable coefficient-based network is trained while the fixed coefficient-based network is fixed when the original image of the current block is encoded.

3. The apparatus of claim 2, wherein the entropy decoder is configured to decode parameters of the variable coefficient-based network from the bitstream.

4. The apparatus of claim 1, wherein the refinement flag is transmitted per block basis, or per picture or slice basis from a video encoding apparatus.

5. The apparatus of claim 1, wherein the refinement flag is determined to be 1 when a predetermined prediction mode is used for intra prediction of the current block.

6. The apparatus of claim 1, wherein the refinement flag is determined to be 1 when matrix weighted intra prediction is used for intra prediction of the current block.

7. The apparatus of claim 1, wherein the refinement flag is determined to be 1 when a plurality of reference lines are used, but reference samples of a row or a column directly adjacent to the current block are not used for intra prediction of the current block.

8. The apparatus of claim 1, wherein the refinement flag is determined to be 1 when reference samples are unavailable in an adjacent row or column for intra prediction of the current block.

9. The apparatus of claim 1, wherein the refinement flag is determined to be 1 when subblocks partitioned from the current block are used for intra prediction of the current block.

10. A video encoding method performed by a video encoding apparatus for intra prediction of a current block, the method comprising:
obtaining an intra prediction mode of the current block, obtaining a refinement flag, or determining the refinement flag, wherein the refinement flag indicates whether to apply a deep learning-based refinement model at a time of intra prediction of the current block;
generating a prediction block of the current block using the intra prediction mode; and
generating a residual block of the current block based on the refinement flag,
wherein, when the refinement flag is 1, generating the residual block includes:
generating a refined prediction block from the prediction block using the refinement model; and
generating the residual block by subtracting the refined prediction block from the current block,
wherein, when the refinement flag is 0, generating the residual block includes:
generating the residual block by subtracting the prediction block from the current block,
wherein the refinement model is implemented using a deep learning model including a fixed coefficient-based network and is pre-trained to generate a refined prediction block approximating an original image of the current block.

11. The method of claim 10, wherein the deep learning model further includes a variable coefficient-based network, and the variable coefficient-based network is trained while the fixed coefficient-based network is fixed when the original image of the current block is encoded.

12. The method of claim 11, further comprising:
encoding parameters of the variable coefficient-based network and transmitting the encoded parameters to a video decoding apparatus.

13. The method of claim 10, further comprising:
transmitting the refinement flag to a video decoding apparatus per block basis or transmitting the refinement flag to the video decoding apparatus per picture or slice basis.

14. The method of claim 10, wherein determining the refinement flag includes:
determining the refinement flag to be 1 when a predetermined prediction mode is used for intra prediction of the current block.

15. A method for providing a video decoding device with video data, the method comprising:
encoding the video data into a bitstream; and
transmitting the bitstream to the video decoding device,
wherein encoding the video data comprises:
obtaining an intra prediction mode of a current block, obtaining a refinement flag, or determining the refinement flag, wherein the refinement flag indicates whether to apply a deep learning-based refinement model at a time of intra prediction of the current block;
generating a prediction block of the current block using the intra prediction mode; and
generating a residual block of the current block based on the refinement flag, wherein, when the refinement flag is 1, generating the residual block includes:
generating a refined prediction block from the prediction block using the refinement model; and
generating the residual block by subtracting the refined prediction block from the current block,
wherein, when the refinement flag is 0, generating the residual block includes:
generating the residual block by subtracting the prediction block from the current block,
wherein the refinement model is implemented using a deep learning model including a fixed coefficient-based network and is pre-trained to generate a refined prediction block approximating an original image of the current block.

16. The method of claim 15, wherein the deep learning model further includes a variable coefficient-based network, and the variable coefficient-based network is trained while the fixed coefficient-based network is fixed when the original image of the current block is encoded.

* * * * *